US012123657B2

(12) United States Patent
Odillard et al.

(10) Patent No.: US 12,123,657 B2
(45) Date of Patent: Oct. 22, 2024

(54) HEAT EXCHANGER

(71) Applicant: Valeo Systemes Thermiques, Le Mesnil Saint-Denis (FR)

(72) Inventors: Laurent Odillard, Le Mesnil Saint Denis (FR); Gilles Bolloch, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 260 days.

(21) Appl. No.: 17/760,915

(22) PCT Filed: Sep. 8, 2020

(86) PCT No.: PCT/FR2020/051548
§ 371 (c)(1),
(2) Date: Mar. 16, 2022

(87) PCT Pub. No.: WO2021/053282
PCT Pub. Date: Mar. 25, 2021

(65) Prior Publication Data
US 2022/0349657 A1 Nov. 3, 2022

(30) Foreign Application Priority Data
Sep. 16, 2019 (FR) .................................. 1910188

(51) Int. Cl.
*F28F 9/00* (2006.01)
*F28D 7/16* (2006.01)
*F28F 9/02* (2006.01)

(52) U.S. Cl.
CPC . *F28D 7/16* (2013.01); *F28F 9/02* (2013.01)

(58) Field of Classification Search
CPC ........ F28F 9/00; F28F 9/002; F28F 2009/004; F28F 9/26; F28F 9/0224; F28F 9/0226;
(Continued)

(56) References Cited

U.S. PATENT DOCUMENTS

2008/0308263 A1   12/2008   Kolb
2011/0088663 A1    4/2011   Dehnen et al.

FOREIGN PATENT DOCUMENTS

CN   1771424 A     5/2006
CN   102735091 A   10/2012
(Continued)

OTHER PUBLICATIONS

Office Action issued in Corresponding CN Application No. 202080071532.8 , dated Aug. 26, 2023. (8 pages).
(Continued)

*Primary Examiner* — George C Jin
*Assistant Examiner* — Teuta B Holbrook
(74) *Attorney, Agent, or Firm* — Osha Bergman Watanabe & Burton LLP

(57) ABSTRACT

A heat exchanger (1) comprising a heat-exchange core (2) in which a plurality of tubes (28) in which a second fluid circulates and a plurality of dissipation devices (30) between which a first fluid circulates are received, and at least one manifold (8) defining an internal volume (42) through which the first fluid passes and facing which is a foot (48) of said manifold (8), the heat exchanger (1) also comprising a connecting part (10) disposed between the heat-exchange core (2) and the manifold (8), the connecting part (10) comprising at least one tab (72) which extends in the internal volume (42) of the manifold (8) and so as to partially overlap the foot (48) of the manifold (8).

14 Claims, 3 Drawing Sheets

(58) Field of Classification Search
CPC .... F28F 9/0248; F28F 9/0246; F28F 2280/02; F28F 2280/10; F28F 2280/105
USPC .................................................. 165/173, 175
See application file for complete search history.

(56) References Cited

FOREIGN PATENT DOCUMENTS

| | | | | |
|---|---|---|---|---|
| CN | 102762947 A | 10/2012 | | |
| CN | 106796089 A | 5/2017 | | |
| CN | 107208984 A | 9/2017 | | |
| CN | 108534580 A | 9/2018 | | |
| DE | 102009050258 B3 * | 11/2010 | .......... | F02B 29/0462 |
| DE | 102018132396 A1 * | 6/2019 | .......... | F28D 1/0408 |
| FR | 2984478 A1 | 6/2013 | | |
| FR | 3026166 A1 | 3/2016 | | |
| FR | 3039263 A1 * | 1/2017 | .......... | F02B 29/0462 |
| FR | 3055821 A1 | 3/2018 | | |

OTHER PUBLICATIONS

Office Action issued in counterpart Chinese Application No. 202080071532.8, dated Mar. 9, 2024 (6 pages).

* cited by examiner

[Fig.1]
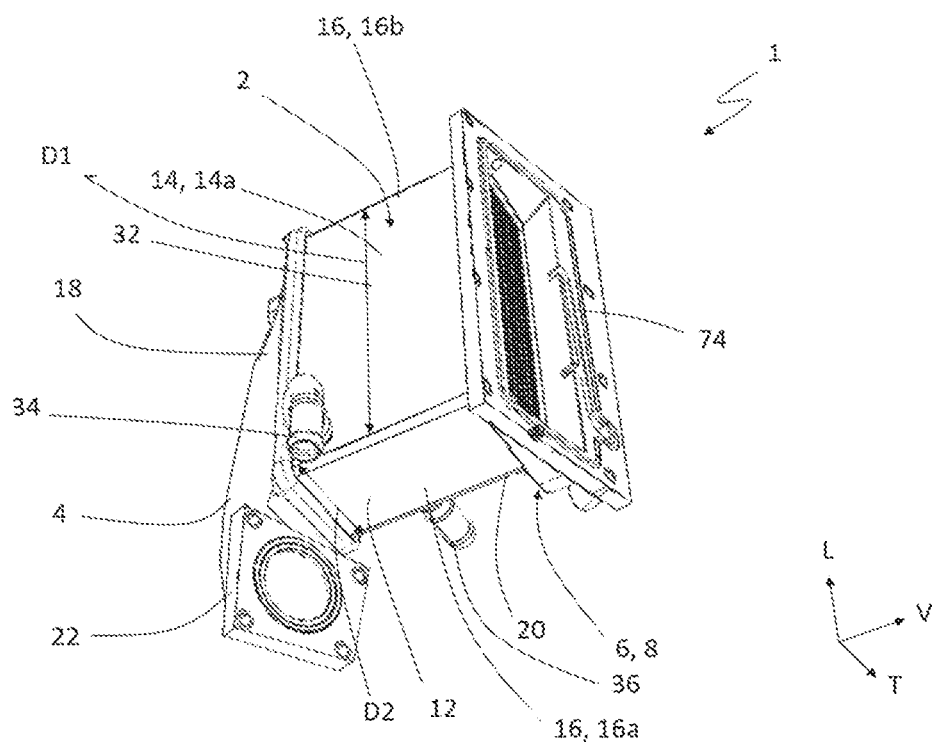

[Fig.2]
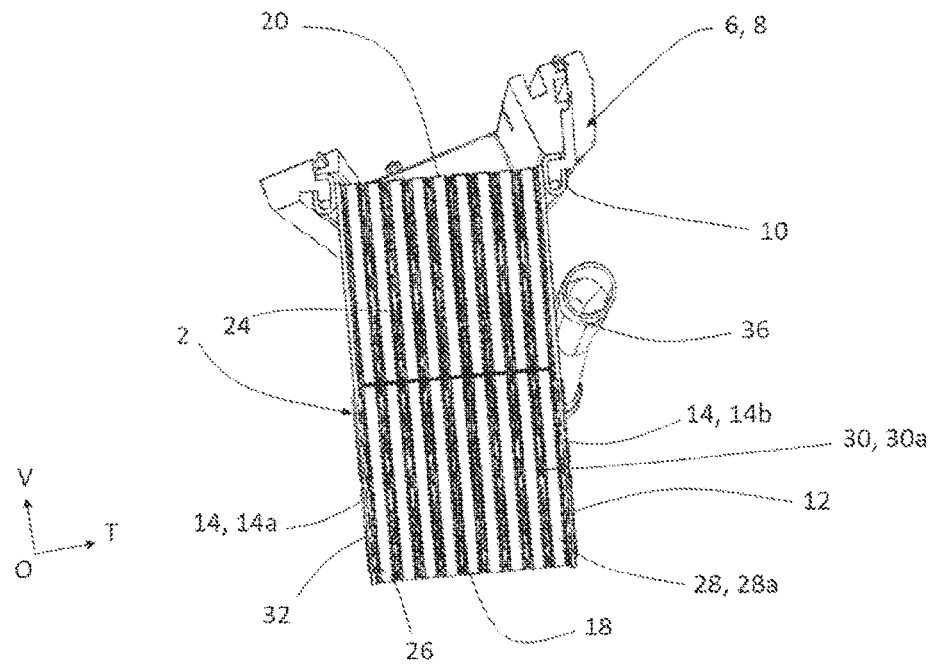
[Fig.3]
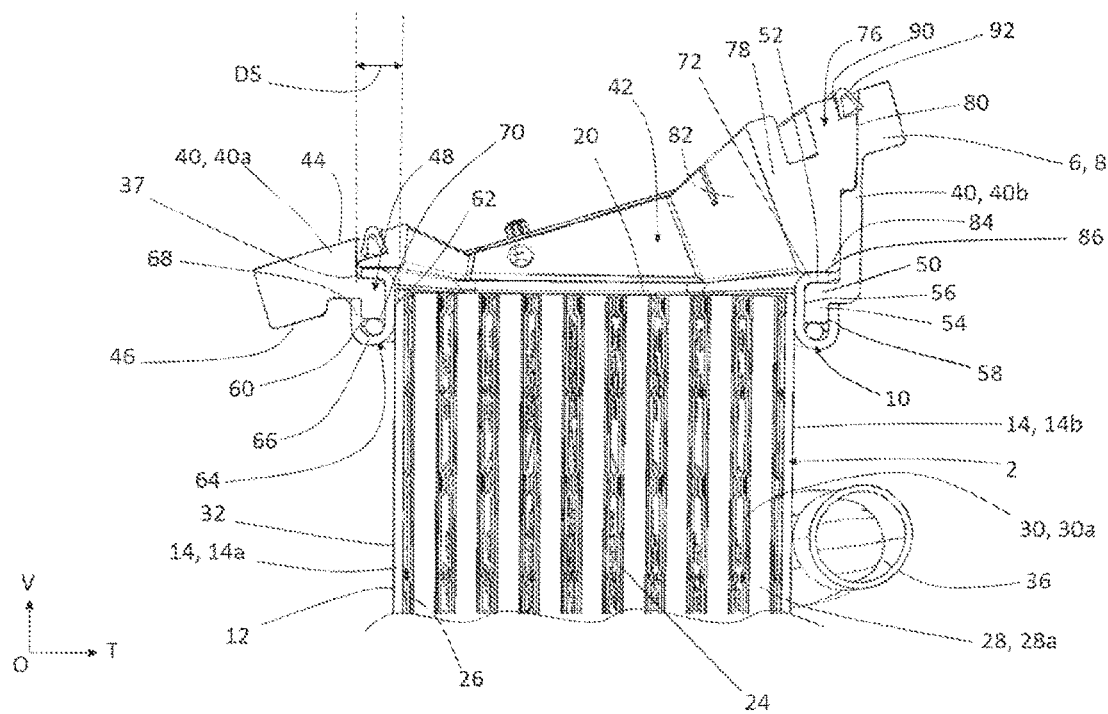

[Fig.4]
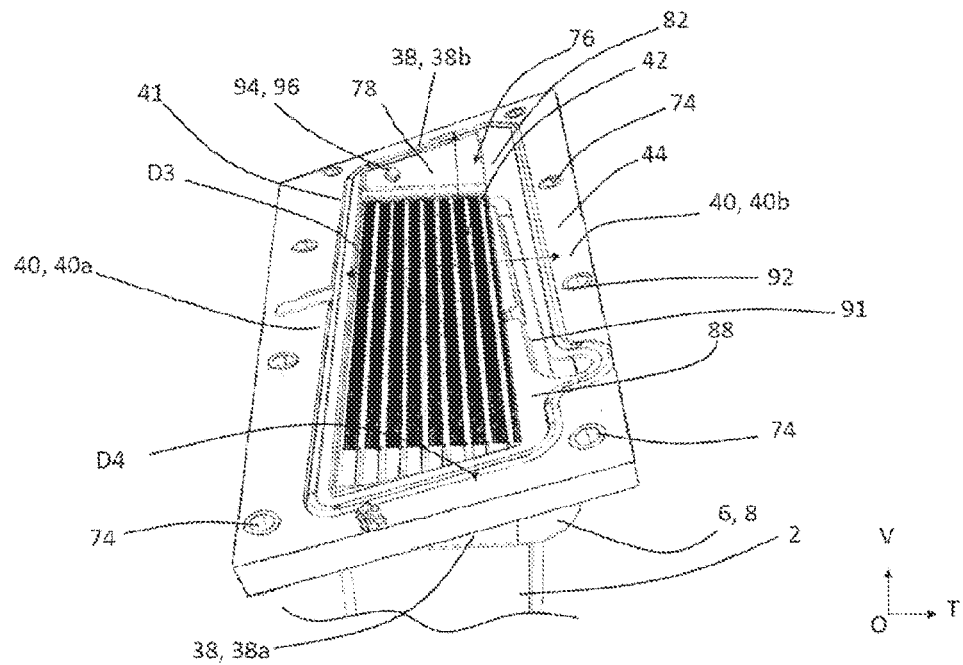
[Fig.5]
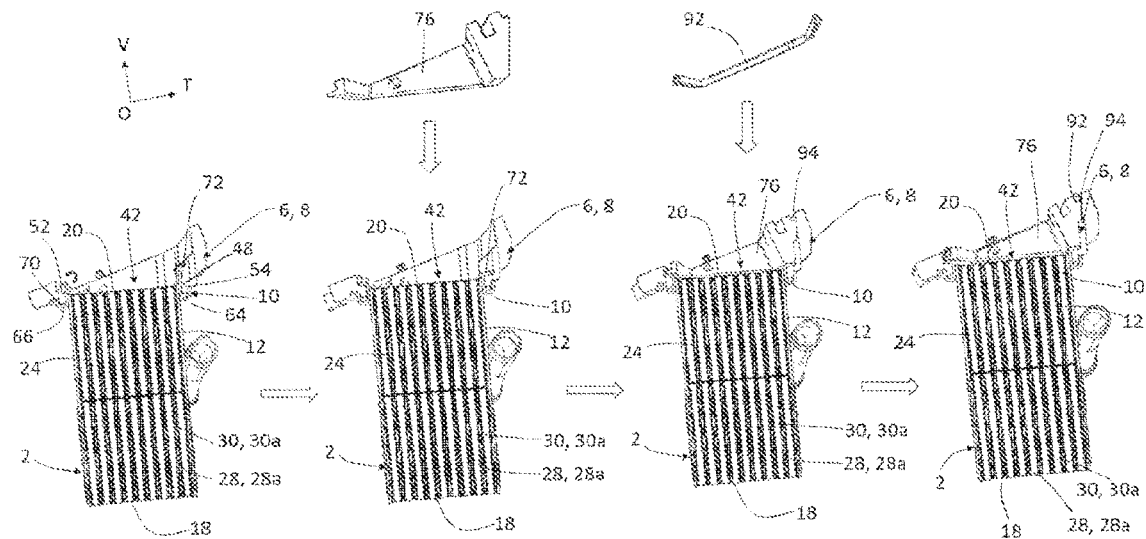

HEAT EXCHANGER

The present invention relates to the field of heat exchangers and more particularly of the fixing-together of a heat-exchange core and an inlet and/or outlet header tank for a fluid that passes through the heat-exchange core.

A heat exchanger, such as for example a charge air cooler, generally has a heat-exchange core comprising tubes, inside which circulates a first heat-transfer fluid. The heat exchanger also comprises inlet or outlet header tanks for a second heat-transfer fluid, in this instance the supercharged charge air coming from a turbocharger. The inlet or outlet header tanks are fixed to the heat-exchange core in such a way that the second heat-transfer fluid circulates between the tubes and is able to exchange heat energy with the first heat-transfer fluid. The outlet header tank is also secured to the motor vehicle by being fixed to a combustion engine of said motor vehicle.

During the process of manufacturing the heat exchanger, the header tanks are generally fixed to the heat-exchange core using a connecting part. This connecting part may comprise a metal edge which extends around the periphery of the heat-exchange core and from which extends a tab which is folded over onto a foot of the header tank by crimping tools.

Usually, the tab is crimped onto the header tank on the outside of the heat exchanger, that is to say outside the volume of the heat exchanger. Such a crimping method then has the drawback of needing a minimum distance required for the crimping and thus prevents the dimensions of the heat exchanger from being reduced. This drawback is all the more prevalent at the outlet header tank of the heat exchanger, on account of its position directly adjacent to other components of the motor vehicle, in particular adjacent to the cylinder head.

The object of the invention is therefore to overcome the abovementioned drawback by providing a connecting part, at least one crimping tab of which extends in an internal volume of the header tank, so that it is crimped in the internal volume defined by said header tank and that it makes it possible to reduce the dimensions of the heat exchanger.

The invention therefore relates to a heat exchanger comprising at least one heat-exchange core in which a first fluid and a second fluid circulate, the heat exchanger comprising at least one manifold for the first fluid, the manifold defining an internal volume through which the first fluid passes and a foot of said manifold facing said internal volume of the manifold, the heat exchanger also comprising a connecting part for fixing the manifold to the heat-exchange core, characterized in that the connecting part comprises at least one tab formed in the internal volume of the manifold, said tab extending so as to at least partially overlap the foot of the manifold.

The heat exchanger is a device allowing exchanges of heat energy between two fluids without the fluids mixing. In the context of the invention, this heat exchanger may in particular be a charge air cooler, the function of which is to cool the air coming from a turbocharger before it is admitted into an internal combustion engine. The heat exchanger then comprises at least one heat-exchange core in which the first fluid and the second fluid circulate and also comprises an outlet header tank, in this instance taking the form of the manifold. It is then possible for the first fluid to be an air flow coming from the turbocharger and for the second fluid to be a liquid, with the manifold directing the air leaving the heat-exchange core toward the internal combustion engine.

The internal volume of the manifold is defined by longitudinal and lateral walls of said manifold and also by an inlet opening and an outlet opening. The foot of the manifold then corresponds to a shoulder which emerges from the longitudinal and lateral walls, this shoulder being directed toward the internal volume and continued substantially perpendicularly by a heel.

In order to secure the manifold to the heat-exchange core, the connecting part is disposed around the periphery of the heat-exchange core such that the foot is received in the connecting part and that the connecting tab extends in the internal volume of the manifold so as to overlap the foot. Expressed differently, the connecting part comprises a contact wall which extends around the periphery of the heat-exchange core and a tab that continues the contact wall and extends in the internal volume of the manifold. This grants more space for the crimping of the tab(s) of the connecting part extending in the internal volume of the manifold.

According to the invention, the connecting part comprises at least a base wall and a groove wall which at least partially delimit a peripheral groove, the foot of the manifold being received at least partially in the groove of the connecting part.

According to one feature of the invention, the foot of the manifold comprises a bearing face facing the base wall of the groove of the connecting part and an upper face which is opposite to the bearing face and faces the tab of the connecting part, with a gasket being received between said bearing face and said base wall.

The base wall of the groove of the connecting part extends from the contact wall away from the tab, that is to say toward the outside of the internal volume of the manifold and substantially perpendicularly to said contact wall. The base wall is then continued by a groove wall which extends substantially perpendicularly to the groove wall and facing the contact wall, so as to form said groove.

The foot comprises both a first face, which extends between the upper face and the bearing face such that it is in contact with the base wall of the connecting part, and a second face, which is opposite to the first face and faces the groove wall. It will then be understood that the foot as disposed in the connecting part is locked in position.

The gasket positioned between the base wall of the connecting part and the bearing face of the manifold foot provides sealing between the foot and the connecting part. According to one variant, the gasket may be directly incorporated in the bearing face of the foot, for example by being co-molded therewith.

According to one feature of the invention, a flow concentrator is disposed at least in part in the internal volume of the manifold. The flow concentrator makes it possible to adapt the fluidic path to combustion-engine cylinder heads of different structures. The flow concentrator therefore tends to bring back or distribute the flow of fluid so as to direct it toward the inlets of each combustion chamber that are formed in the cylinder head. The flow concentrator is then an attached part disposed in the internal volume of the manifold and having dimensions, in particular a height equivalent to the height of the manifold. Equivalent height is understood to mean that the flow channeler does not extend outside the internal volume of the manifold. It is also the case that the flow concentrator comprises at least one channeling face which extends in a plane which is inclined relative to a face of the manifold.

According to one feature of the invention, the flow concentrator comprises a support face which is in contact with the tab of the connecting part.

According to one feature of the invention, the flow concentrator comprises an inlet section delimited by the support face and an outlet section that is opposite the inlet section and directed toward the outside of the internal volume of the manifold, the outlet section being smaller than the inlet section. The inlet section is the one through which the first fluid enters the flow concentrator and the outlet section is the one through which this first fluid leaves the flow concentrator.

More specifically, the flow concentrator is disposed in the internal volume of the manifold such that it bears against at least one tab of the connecting part. The flow concentrator may be disposed entirely on the tab(s) of the connecting part, and directs the air flow leaving the heat-exchange core by virtue of the presence of a channeling face which is inclined in the internal volume and toward the heat-exchange core.

According to one feature of the invention, a slit is formed in one of the faces of the flow concentrator such that said slit communicates with the internal volume of the manifold and in which slit the air flow of the heat exchanger circulates. The slit avoids the effects of overpressure in the internal volume of the manifold by discharging some of the air flow from the heat exchanger.

According to one feature of the invention, a sealing part is disposed between the manifold and the flow concentrator, the sealing part being configured to bear against a component which is external to the heat exchanger and to which said heat exchanger is secured. The sealing part may be for example a gasket and limits leakages of the first fluid between the internal volume of the manifold and the flow concentrator. It is also the case that the sealing part provides sealing between the internal volume of the manifold and the cylinder head to which the manifold is fixed.

According to one feature of the invention, the manifold comprises a through-channel and the flow concentrator comprises an opening formed facing the through-channel, with the through-channel and the opening leading into the internal volume of the manifold.

The through-channel and the opening allow an operator to pass through a temperature measuring apparatus, for example.

According to one feature of the invention, the heat-exchange core comprises a peripheral shell which at least partially delimits an internal space in which a plurality of tubes aligned in series and a plurality of dissipation devices arranged between the tubes of the plurality of tubes are received, the second fluid circulating in at least one of the tubes of the plurality of tubes and the first fluid circulating between two tubes of the plurality of tubes along at least one of the dissipation devices of the heat-exchange core.

More specifically, the peripheral shell defines an internal space in which the plurality of dissipation devices and the plurality of tubes are disposed, the second fluid circulating in at least one of the tubes after entering the heat-exchange core by way of at least one inlet pipe and leaving by way of at least one outlet pipe for said second fluid. It will then be understood that the second fluid circulating in the tubes exchanges heat energy with the first fluid by means of the plurality of dissipation devices, thus maximizing the surface area for the exchange of heat energy.

According to one feature of the invention, the heat-exchange core comprises a first end and a second end on either side of the heat-exchange core, through which ends the first fluid enters or leaves the heat-exchange core, an inlet header tank for the first fluid being disposed at the first end of the heat-exchange core, whereas the manifold is disposed at the second end of the heat-exchange core.

The tubes and the plurality of dissipation devices extend between the first end and the second end of the heat-exchange core. An inlet pipe may be connected to the inlet header tank in order to direct the air leaving the turbocharger toward the heat-exchange core.

The invention also relates to a method for assembling a heat exchanger according to the abovementioned features, in the course of which at least one of the tabs of the connecting part which extends in the internal volume of the manifold is deformed, such that said tab at least partially overlaps the foot of said manifold.

A first step of the method may for example comprise the installation of the gasket in the groove of the connecting part against the base wall. A second step may be for example the insertion of the foot of the manifold into the groove of the connecting part such that the bearing face of the foot is in contact with the gasket, the third step then being the deformation of the tab of the connecting part such that it overlaps the upper face of the foot. Lastly, a fourth step may be the installation of the flow concentrator in the internal volume of the manifold such that its support face is in contact with the tab of the connecting part.

Further features, details and advantages of the invention will become more clearly apparent from reading the following description, and also from a number of exemplary embodiments given by way of nonlimiting indication, with reference to the appended schematic drawings, in which:

FIG. 1 is a perspective general view of a heat exchanger according to the invention;

FIG. 2 is a sectional view along an OVT plane of the heat exchanger of FIG. 1;

FIG. 3 is a close-up view of the sectional view of FIG. 2, showing the manifold secured to the heat-exchange core by means of a connecting part;

FIG. 4 is a perspective and top view of the manifold, showing an internal volume and a flow concentrator disposed in said internal volume;

FIG. 5 illustrates the steps for mounting the heat exchanger of FIG. 1.

The features, variants and different embodiments of the invention may be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage or to distinguish the invention from the prior art.

FIG. 1 illustrates a heat exchanger 1 according to the invention. The heat exchanger 1, in this instance a charge air cooler, is composed of a heat-exchange core 2, at least one connecting part 10, an inlet header tank 4 and an outlet header tank 6, in this instance taking the form of a manifold 8.

The heat-exchange core 2 is composed of a peripheral shell 12 taking the form of a quadrilateral and is defined by two longitudinal walls 14 and two lateral walls 16. More specifically, the heat-exchange core 2 comprises a first lateral wall 16a and a second lateral wall 16b which extend parallel to one another, and a first longitudinal wall 14a and a second longitudinal wall 14b which extend parallel to one another and perpendicularly to the first lateral wall 16a and the second lateral wall 16b, and such that they connect said lateral walls.

A first distance D1 is defined as the distance measured along a straight line parallel to a longitudinal direction L of the heat exchanger 1, between the first lateral wall 16a and the second lateral wall 16b. A second distance D2 is defined as the distance measured along a straight line parallel to a transverse direction T of the heat exchanger 1, perpendicular to the longitudinal direction L of the heat exchanger 1, between the first longitudinal wall 14a and the second longitudinal wall 14b. It will then be understood that the first distance D1 defines the longitudinal dimension and the second distance D2 defines the transverse dimension of the heat-exchange core 2, the first distance D1 being greater than the second distance D2.

The heat-exchange core 2 is delimited in a vertical direction V, perpendicular to the longitudinal direction L and transverse direction T of the heat exchanger 1, by a first end 18 and a second end 20, which is opposite the first end 18 in the vertical direction V of the heat exchanger 1. The inlet header tank 4 is then positioned at the first end 18 of the heat-exchange core 2, whereas the manifold 8 is positioned at the second end 20 of the heat-exchange core 2.

An inlet pipe 22 is connected to the inlet header tank 4 in order to direct a first fluid toward said inlet header tank 4. It will then be understood that the first fluid, for example a flow of supercharged charge air from an internal combustion engine, circulates between the inlet header tank 4 and the manifold 8, passing through the heat-exchange core 2, and more particularly passing through an internal space 24 of the heat-exchange core 2, this being visible in FIG. 2. The internal space 24 is defined by an internal face 26 of the peripheral shell 12 of the heat-exchange core 2, and corresponds to the space in which a plurality of tubes 28 and a plurality of dissipation devices 30 are received. An external face 32, which is opposite to the internal face 26 of the peripheral shell 12, corresponds to that face of the peripheral shell 12 that faces away from the space occupied by the heat-exchange core 2.

The tubes 28 are rolled tubes or result from the securement of two plates between which a second fluid circulates and around which the first fluid circulates.

The dissipation devices 30 may take the form of a fin or spacer disposed in the space which separates two successive tubes 28.

The tubes constituting the plurality of tubes 28 and the fins constituting the plurality of dissipation devices 30 extend in the heat-exchange core 2 between the first end 18 and the second end 20. As can be seen in particular in FIG. 2, the plurality of tubes 28 is arranged in the internal space 24 in rows of tubes 28a in the longitudinal direction L of the heat exchanger 1, said tubes being spaced apart from one another so as to receive the plurality of dissipation devices 30 arranged in rows of dissipation devices 30a in the longitudinal direction L of the heat exchanger 1, said dissipation devices being disposed between the tubes 28a.

The second fluid, in this instance a liquid, for example glycol solution, circulates in the plurality of tubes 28, between at least one inlet pipe 34, which is visible in FIG. 1, and at least one outlet pipe 36, which is visible in FIG. 2. It will then be understood that the circulation of the second fluid in the plurality of tubes 28 makes it possible to exchange heat energy with the first fluid, which passes through channels of the heat-exchange core 2 that are delimited by the tubes 28. The exchange of heat energy is then optimized by the presence of the plurality of dissipation devices 30 disposed between the tubes 28, since the dissipation devices increase the surface area for the exchange of heat energy between the first fluid and the second fluid, in such a way as to cool the second fluid.

The manifold 8 and the connecting member 10 will now be described in more detail in relation to FIG. 3 and FIG. 4.

The manifold 8 takes substantially the form of a quadrilateral defined by two lateral edges 38 and two longitudinal edges 40. The manifold also comprises an inlet opening 37 and an outlet opening 41, which are opposite one another in the vertical direction V of the heat exchanger and through which the first fluid passes. The lateral and longitudinal edges and also the inlet opening 37 and the outlet opening 41 then define an internal volume 42 of said manifold 8.

More specifically, a first longitudinal edge 40a and a second longitudinal edge 40b extend generally parallel to and continue the first longitudinal wall 14a and the second longitudinal wall 14b of the heat-exchange core 2. Similarly, a first lateral edge 38a and a second lateral edge 38b extend generally parallel to and continue the first lateral wall 16a and the second lateral wall 16b of the heat-exchange core 2, such that said first and second lateral edges connect the first longitudinal edge 40a and the second longitudinal edge 40b.

According to one feature of the invention, the first longitudinal edge 40a and the second longitudinal edge 40b are spaced apart from one another by a third distance D3, measured along a straight line parallel to the transverse direction T of the heat exchanger 1. According to the invention, the third distance D3 is strictly greater than the abovementioned second distance D2. Similarly, the first lateral edge 38a and the second lateral edge 38b are spaced apart from one another by a fourth distance D4, measured along a straight line parallel to the longitudinal direction L of the heat exchanger 1. The fourth distance D4 is then strictly greater than the abovementioned first distance D1.

It will then be understood from the above that the peripheral shell 12 of the heat-exchange core 2, and more specifically the external face 32 of the peripheral shell 12, and the longitudinal edges 40 and lateral edges 38 of the manifold 8 are spaced apart from one another by a fifth, non-zero distance D5.

The internal volume 42 thus defined by the lateral edges 38 and longitudinal edges 40 of the manifold 8 is then formed so as to continue the plurality of tubes 28 and the plurality of dissipation devices 30 at the second end 20 of the heat-exchange core 2, such that the first fluid, circulating from the inlet header tank 4, passes through the internal space 24 of the heat-exchange core 2 then the internal volume 42 of said manifold 8, to finally leave the heat exchanger according to the invention.

A distal end 44 of the manifold 8 is defined as the end furthest away from the heat-exchange core 2, and a proximal end 46 of the manifold 8 opposite the distal end 44 in the vertical direction V of the heat exchanger 1, the proximal end 46 being closest to the heat-exchange core 2.

The manifold 8 comprises a foot 48 formed at the proximal end 46 of said manifold 8, such that it occupies at least in part the space formed by the abovementioned fifth distance D5. The foot 48 comprises in particular a shoulder 50 formed at the longitudinal edges 40 and the lateral edges 38 of the manifold 8 and more specifically at the proximal end 46 of the manifold 8. Expressed differently, the shoulder 50 extends substantially perpendicularly to the longitudinal edges 40 and to the lateral edges 38, extending toward an internal portion of the heat exchanger through which the first fluid passes. An upper face 52 of the foot is then defined as that face of the foot 48 that is formed by the shoulder 50 and is directed toward the internal volume 42 of the manifold 8. This upper face 52 of the foot 48 is thus accessible from the internal volume 42 of the manifold 8.

A heel 54 extends from the shoulder 50, perpendicularly thereto. The heel 54 therefore extends substantially parallel to and facing the peripheral shell 12. The heel 54 is thus delimited at least in part by a first face 56, the latter facing the external face 32 of the heat-exchange core 2, and by a second face 58 opposite to the first face 56, that is to say facing away from the heat-exchange core 2.

At a free end, the heel 54 is delimited by a bearing face 60 which extends substantially perpendicularly to and between the first face 56 and the second face 58 of the heel 54.

The connecting part 10 provides the mechanical connection between the heat-exchanger core and the manifold 8. This connecting part 10 extends at the periphery of the heat-exchange core 2, in the space formed by the abovementioned fifth distance D5, at its second end 20 and such that it is in contact with the foot 48 of the manifold 8 and the external face 32 of the peripheral shell 12 of the heat-exchange core 2. It will then be understood that the function of the connecting part 10 is to secure the manifold 8 to the heat-exchange core 2.

To this end, the connecting part 10 comprises a contact wall 62 which extends parallel to the peripheral shell 12 and is disposed against the external face 32 of said peripheral shell 12. The connecting part 10 also comprises a groove 64 delimited by a base wall 66 which extends substantially perpendicularly from the contact wall 62 at an end of this contact wall 62 that is opposite the internal volume 42 of the manifold 8. The base wall 66 is then continued by a groove wall 68 which extends substantially perpendicularly to and from said base wall 66 and toward the manifold 8.

According to an exemplary embodiment of the invention, a gasket 70 is received in the groove 64 of the connecting part 10, such that it is against the base wall 66 which partially delimits said groove 64. The gasket 70 provides sealing of the fixing of the manifold 8 against the heat-exchange core 2. According to an example that is not illustrated, the gasket 70 may be directly incorporated in the bearing face 60 of the heel 54 of said foot 48 of the manifold 8, in particular by co-molding and for the purpose of overmolding this gasket 70 on the manifold 8.

The foot 48 of the manifold 8 is disposed in the connecting part 10 such that the first face 56 of said foot is against the contact wall 62 and that the bearing face 60 of said foot faces the base wall 66 of the groove 64 of the connecting part 10, and in particular is in contact with the gasket 70 received in the groove 64. The second face 58 of the heel 54 then faces the groove wall 68 of the connecting part 10.

At least one tab 72 extends substantially perpendicularly to the contact wall 62 of the connecting part 10, from an end opposite which the base wall 66 extends. Expressed differently, the tab(s) 72 emerge from the contact wall 62 such that it/they extend(s) into the internal volume 42 of the manifold 8. More specifically, the tab(s) 72 extend(s) in the internal volume 42 of the manifold 8 such that it/they extend(s) so as to overlap the upper foot face 52 of the foot 48 of the manifold 8.

It will be understood from what has just been described that the connecting part 10 makes it possible both to prevent the movements of the manifold 8 in the transverse direction T of the heat exchanger 1, by means of the groove wall 68, and to prevent the movements of the manifold 8 in the vertical direction V of the heat exchanger 1, by means of the tab(s) 72 and the base wall 66.

The tab(s) 72 is/are thus accessible from the internal volume of the manifold 8 such that they can be folded over the foot 48 which is accommodated in the groove 64 of the connecting part 10.

As can be seen in FIGS. 3 and 4, the inlet opening 37 of the manifold 8 extends in a plane which is substantially perpendicular to the plurality of tubes 28 of the heat-exchange core 2 whereas the outlet opening 41 extends in a plane which is inclined relative to the plane defined by the inlet opening 37.

At least one fixing tab 74 extends from the distal end 44 of the manifold 8, and away from the internal volume 42 of said manifold 8. In the example illustrated, the manifold 8 comprises a plurality of fixing tabs 74, each comprising a bore for fixing the heat exchanger 1 within a motor vehicle, for example by screwing.

In the example of the invention illustrated, a flow concentrator 76 is disposed at least partially in the internal volume 42 of the manifold 8. The flow concentrator 76 comprises a channeler wall 78 which extends in the internal volume 42 of the manifold 8 in contact with the longitudinal edges 40 and the lateral edges 38 of the manifold 8. The channeler wall 78 of the flow concentrator 76 extends in a vertical dimension substantially identical to said longitudinal edges 40 and lateral edges 38 of the manifold 8.

The channeler wall 78 comprises a manifold face 80 facing the longitudinal edges 40 and lateral edges 38 of the manifold 8 and a channeling face 82, opposite to the manifold face 80 and facing the internal volume 42 of the manifold 8. According to the invention, the manifold face 80 extends parallel to said lateral edges 38 and longitudinal edges 40 with which it is in contact, while the channeling face 82 extends in a plane which is inclined relative to the manifold face 80, the inclination being directed toward the heat-exchange core 2. A cross section of the outlet of the flow concentrator 76 thus has smaller dimensions than a cross section of the inlet of this same flow concentrator 76.

According to one feature of the invention, the channeler wall 78 comprises a first concentrator end 84, from which a support face 86 extends, and a second concentrator end 88, which is opposite the first end 84 in the vertical direction V of the heat exchanger 1. The support face 86 extends substantially perpendicularly with respect to the longitudinal edges 40 and lateral edges 38 of the manifold 8 and such that it bears against at least one of the tabs 72 of the connecting part 10. It will then be understood that the flow concentrator 76 is disposed in the internal volume 42 of the manifold 8 such that it rests on the connecting part 10.

It will be understood from the description given of the flow concentrator 76 that the latter directs the air flow leaving the heat-exchange core 2 and passing through the internal volume 42 of the manifold 8 on an oriented trajectory, in particular by means of its channeling face 82, which is inclined in the direction of said heat-exchange core 2. The flow concentrator 76 also makes it possible to adapt the manifold 8 to combustion-engine cylinder heads the structural features of which may be different from one motor vehicle to another.

Between the distal end 44 of the manifold 8 and the second concentrator end 88 of the flow concentrator 76, there is formed a peripheral clearance 90, in which is disposed a sealing part 92, which may for example be a gasket. The function of the sealing part 92 is to provide sealing between the manifold 8 and the flow concentrator 76 and also sealing between a component external to the heat exchanger, for example a cylinder head, and the manifold 8 that is fixed to the external component.

A through-channel 94 is formed through the manifold 8, and more specifically in one of the lateral edges 38 of said manifold 8, such that the through-channel 94 leads into the internal volume 42 of the manifold 8. To this end, an opening 96 is formed in the flow concentrator 76 facing the through-channel 94, such that the opening 96 and the through-channel 94 lead into the internal volume 42 of the manifold 8. Such a through-channel 94 coupled to the opening 96 of the flow concentrator 76 allows the passage of a temperature or pressure measuring tool, for example.

According to one example of the invention, at least one slit 91 is formed in one of the faces of the flow concentrator 76, more specifically at the second concentrator end 88 of the flow concentrator 76 and such that said slit communicates with the internal volume 42 of the manifold 8. Thus, it will be understood that some of the air flow circulating in the internal volume 42 circulates in the slit 91 of the flow concentrator 76. An overpressure within the internal volume 42 of the manifold 8 is avoided in this way.

A method for assembling the manifold 8 on the heat-exchange core 2 will now be described in relation to FIG. 5, which illustrates four steps of this mounting method using four diagrams.

During the assembly method, the connecting part 10 is secured beforehand to the external face 32 of the peripheral shell 12 of the heat-exchange core 2, at the second, vertical end 20, as was previously mentioned. By way of example, the connecting part 10 is thus brazed to the external face 32 of the peripheral shell 12. The tab(s) 72 of the connecting part 10 then extend(s) parallel to the peripheral shell 12 of the heat-exchange core 2, as can be seen in FIG. 5.

In a first step of the assembly method, an operator places the gasket 70 in the groove 64 of the connecting part 10, that is to say against the base wall 66. Following this first step, the second step of the assembly method consists in positioning the manifold 8 at the second end 20 of the heat-exchange core 2, such that the foot 48 of the manifold 8 is received in the connecting part 10.

More specifically, the operator places the foot 48 of the manifold 8 in the connecting member 10 so that the heel 54 is received in the groove 64 of the connecting part 10 and the gasket 70 is thus interposed between the bearing face 60 and the base wall 66 of the groove 64.

After the manifold 8 has been installed, the tab 72 or the tabs 72 of the connecting part 10 then extend(s) in the internal volume 42 of the manifold 8. More specifically, the tab 72 extends parallel between the peripheral shell 12 of the heat-exchange core 2 and the longitudinal edges 40 and the lateral edges 38 of the manifold 8.

In a third step, the operator introduces a crimping device (not visible) into the internal volume 42 of the manifold 8 in order to fold the tab(s) 72 of the connecting part 10 onto the upper face 52 of the foot 48. Expressed differently, the operator deforms the tab 72 of the connecting part 10 so that the latter is in contact with said upper face 52 of the foot 48. After this crimping operation, the tab 72 extends perpendicularly to the contact wall 62 of the connecting part 10. This folding of the tab(s) 72 is carried out in such a way that the free end of the tab(s) 72 faces the environment outside the heat exchanger according to the invention. This third step thus involves crimping the manifold 8 onto the heat-exchange core 2, via tabs 72 that are present in the internal volume 42 of the heat exchanger.

It will then be understood that the tab 72 as crimped on the foot 48 of the manifold 8 makes it possible, in cooperation with the groove 64 of the connecting part 10, to prevent the movement of the manifold 8 in the vertical direction V by preventing the foot 48 from leaving the groove 64 of the connecting part 10 in any way.

In a fourth step of the assembly method, the operator places the flow concentrator 76 in the internal volume 42 of the manifold 8 such that the support face 86 of said flow concentrator 76 partially or entirely bears against the tab 72 of the connecting part 10.

Lastly, in an optional fifth step, the operator places the sealing means 92 between the manifold 8 and the flow concentrator 76, at the distal end 44 of the manifold 8 and the second concentrator end 88 of the flow concentrator 76, respectively, in the peripheral clearance 90 formed for this purpose.

The advantage of such a method for assembling the manifold 8 with the connecting part 10 is that it makes it possible to perform crimping directly in the internal volume 42 of the manifold 8, thus allowing the dimensions of the heat exchanger to be reduced, since there is no longer the need for a minimum crimping distance between the outlet header tank and the outside of the heat exchanger.

The present invention is not limited to the means and configurations described and illustrated herein, however, but also extends to all equivalent means and configurations and to any technically functional combination of such means.

The invention claimed is:

1. A heat exchanger comprising:
    at least one heat-exchange core in which a first fluid and a second fluid circulate;
    a manifold for the first fluid, the manifold defining an internal volume through which the first fluid passes and a foot,
    wherein the foot of the manifold is formed at a proximal end of the manifold and faces the internal volume of the manifold; and
    a connecting part for fixing the manifold to the heat-exchange core,
    wherein the connecting part comprises a tab formed in the internal volume of the manifold, the tab extending so as to at least partially overlap the foot of the manifold,
    wherein the internal volume of the manifold is defined by longitudinal and lateral walls of the manifold, and
    wherein the foot of the manifold comprises a bearing face facing a base wall of a groove of a connecting part and an upper face which is opposite to the bearing face and faces the tab of the connecting part, with a gasket being received between the bearing face and the base wall.

2. The heat exchanger as claimed in claim 1, wherein the connecting part comprises the base wall and a groove wall which at least partially delimit a peripheral groove, the foot of the manifold being received at least partially in the groove of the connecting part.

3. The heat exchanger as claimed in claim 1, wherein a flow concentrator is disposed at least in part in the internal volume of the manifold.

4. The heat exchanger as claimed in claim 3, wherein the flow concentrator comprises a support face which is in contact with the tab of the connecting part.

5. The heat exchanger as claimed in claim 4, wherein the flow concentrator comprises an inlet section delimited by the support face and an outlet section that is opposite the inlet section and directed toward the outside of the internal volume of the manifold, the outlet section being smaller than the inlet section.

6. The heat exchanger as claimed in claim 3, wherein a slit is formed in one of the faces of the flow concentrator such that said slit communicates with the internal volume of the manifold and in which slit an air flow of the heat exchanger circulates.

7. The heat exchanger as claimed in claim 3, wherein a sealing part is disposed between the manifold and the flow concentrator, the sealing part being configured to bear against a component which is external to the heat exchanger and to which said heat exchanger is secured.

8. The heat exchanger as claimed in claim 1, wherein the heat-exchange core comprises a peripheral shell which at least partially delimits an internal space in which a plurality of tubes aligned in series and a plurality of dissipation devices arranged between the tubes of the plurality of tubes are received, the second fluid circulating in at least one of the tubes of the plurality of tubes and the first fluid circulating between two tubes of the plurality of tubes along at least one of the dissipation devices of the heat-exchange core.

9. The heat exchanger as claimed in claim 1, wherein the heat-exchange core comprises a first end and a second end on either side of the heat-exchange core, through which ends the first fluid enters or leaves the heat-exchange core, an inlet header tank for the first fluid being disposed at the first end of the heat-exchange core, whereas the manifold is disposed at the second end of the heat-exchange core.

10. A method for assembling a heat exchanger as claimed in claim 1, the method comprising:
   deforming at least one of the tabs of the connecting part which extends into the internal volume of the manifold, such that said tab at least partially overlaps the foot of said manifold.

11. The method of claim 10, wherein the connecting part comprises at least a base wall and a groove wall which at least partially delimit a peripheral groove, the foot of the manifold being received at least partially in the peripheral groove of the connecting part, the method further comprising: installing a gasket in the peripheral groove of the connecting part against the base wall.

12. The method of claim 11, wherein the foot of the manifold comprises a bearing face facing the base wall of the peripheral groove of the connecting part and an upper face which is opposite to the bearing face and faces the tab of the connecting part, the method further comprising: inserting the foot of the manifold into the groove of the connecting part such that the bearing face of the foot is in contact with the gasket, with the gasket being received between said bearing face and said base wall.

13. The method of claim 10, further comprising: deforming the tab of the connecting part such that it overlaps the upper face of the foot.

14. The method of claim 10, further comprising: installing a flow concentrator in the internal volume of the manifold such that its support face is in contact with the tab of the connecting part.

* * * * *